(12) United States Patent
Malagrino et al.

(10) Patent No.: US 6,714,985 B1
(45) Date of Patent: Mar. 30, 2004

(54) METHOD AND APPARATUS FOR EFFICIENTLY REASSEMBLING FRAGMENTS RECEIVED AT AN INTERMEDIATE STATION IN A COMPUTER NETWORK

(75) Inventors: Dante Malagrino, Santa Clara, CA (US); Thomas J. Edsall, Cupertino, CA (US); Silvano Gai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/561,839

(22) Filed: Apr. 28, 2000

(51) Int. Cl.[7] .............................................. G06F 15/16
(52) U.S. Cl. ...................................... 709/236; 370/394
(58) Field of Search ......................... 709/236; 370/476, 370/394, 503

(56) References Cited

U.S. PATENT DOCUMENTS

| | | | | |
|---|---|---|---|---|
| 5,408,469 A | * | 4/1995 | Opher et al. ................ 370/399 |
| 5,481,536 A | | 1/1996 | Reisch et al. ............... 370/394 |
| 5,560,038 A | | 9/1996 | Haddock .................... 709/236 |
| 5,859,550 A | | 1/1999 | Brandt | |
| 5,881,242 A | | 3/1999 | Ku et al. | |
| 6,054,942 A | | 4/2000 | Stemmler | |
| 6,061,349 A | | 5/2000 | Coile et al. | |
| 6,115,385 A | | 9/2000 | Vig | |
| 6,131,117 A | | 10/2000 | Clark et al. | |
| 6,226,771 B1 | | 5/2001 | Hilla et al. | |
| 6,233,243 B1 | * | 5/2001 | Ganmukhi et al. ......... 370/412 |
| 6,480,468 B1 | * | 11/2002 | Kishigami et al. ....... 370/230.1 |
| 6,487,211 B1 | * | 11/2002 | Yamaguchi ................. 370/412 |

OTHER PUBLICATIONS

McAuley and Francis; INFOCOM '93. Proceedings. Twelfth Annual Joint Conference of the IEEE Computer and Communications Societies. IEEE, 1993. Pp. 1382–1391 vol. 3.*

U.S. patetn application Ser. No. 09/469,062, Edsall, et al., filed Dec. 21. 1999.

U.S. patent application Ser. No. 09/469,459, Edsall et al., filed Dec. 21, 1999.

Information Sciences Institute, RFC 791: Internet Protocol DARPA Internet Program Protocol Specification, Information Sciences Institute, University of Southern California, Sep. 1981, pp. 1–45.

* cited by examiner

Primary Examiner—David Wiley
Assistant Examiner—Scott M. Collins
(74) Attorney, Agent, or Firm—Cesari and McKenna, LLP (57) ABSTRACT

An IP packet reassembly engine provides high-speed and efficient reassembly of IP fragments received at an intermediate station in a computer network. The IP packet reassembly engine comprises a main controller logic circuit configured to "speed-up" re-assembly of original packets from IP fragments stored in a frame buffer at multi-gigabit per second rates. To that end, the reassembly engine further includes a content addressable memory having a plurality of entries for maintaining status information for each received fragment and for each original packet being reassembled from the fragments.

42 Claims, 9 Drawing Sheets

| COS 610 | IDX 612 | ODX 614 | BYT 616 | Min_Thresh. 618 | Max_Thresh. 620 |
|---|---|---|---|---|---|
| 3'b000 | Q0_IDX | Q0_ODX | Q0_BYT | Q0_MIN_THR | Q0_MAX_THR |
| 3'b001 | Q1_IDX | Q1_ODX | Q1_BYT | Q1_MIN_THR | Q1_MAX_THR |
| 3'b010 | Q2_IDX | Q2_ODX | Q2_BYT | Q2_MIN_THR | Q2_MAX_THR |
| 3'b011 | Q3_IDX | Q3_ODX | Q3_BYT | Q3_MIN_THR | Q3_MAX_THR |
| 3'b100 | Q4_IDX | Q4_ODX | Q4_BYT | Q4_MIN_THR | Q4_MAX_THR |
| 3'b101 | Q5_IDX | Q5_ODX | Q5_BYT | Q5_MIN_THR | Q5_MAX_THR |
| 3'b110 | Q6_IDX | Q6_ODX | Q6_BYT | Q6_MIN_THR | Q6_MAX_THR |
| 3'b111 | Q7_IDX | Q7_ODX | Q7_BYT | Q7_MIN_THR | Q7_MAX_THR |

FIG. 6

|  | KEY 720 | | | | | | DATA 750 | | |
|---|---|---|---|---|---|---|---|---|---|
|  | COS 722 | IDX 724 | FFM 726 | 4TUP 728 | OFF 730 | TMR 732 | PTR 752 | CLEN 754 | TLEN 756 |
| NO REASSEMBLY REQUIRED | COS | IDX | 1 | 4TUP | 0 | NULL | PTR | CLEN | TLEN |
| FIRST FRAGMENT IS NOT ZERO OFFSET | COS | NULL | 1 | 4TUP | OFF | TMR | PTR | CLEN | TLEN |
| SUBSEQUENT FRAGMENT IS NOT ZERO OFFSET | COS | NULL | 0 | 4TUP | OFF | NULL | PTR | X | X |
| FIRST FRAGMENT IS ZERO OFFSET | COS | IDX | 1 | 4TUP | 0 | TMR | PTR | CLEN | TLEN |
| SUBSEQUENT FRAGMENT IS ZERO OFFSET | COS | IDX | 0 | 4TUP | 0 | NULL | PTR | X | X |

METHOD AND APPARATUS FOR EFFICIENTLY REASSEMBLING FRAGMENTS RECEIVED AT AN INTERMEDIATE STATION IN A COMPUTER NETWORK

FIELD OF THE INVENTION

This invention relates generally to computer networks and, more particularly, to efficient reassembly of data packets in an intermediate station of a computer network.

BACKGROUND OF THE INVENTION

A computer network is a geographically distributed collection of interconnected communication media for transporting data between entities. An entity may consist of any device, such as a host or end station, that sources (i.e., transmits) and/or receives network messages over the communication media. Many types of computer networks are available, with the types ranging from local area networks (LANs) to wide area networks (WANs). The end stations, which may include personal computers or workstations, typically communicate by exchanging discrete messages, such as frames or packets, of data according to predefined protocols. In this context, a protocol consists of a set of rules defining how the stations interact with each.

Computer networks may be further interconnected by an intermediate station, such as a switch or router, having a plurality of ports that may be coupled to the networks. For example, a switch may be utilized to provide a "switching" function for transferring information between a plurality of LANs at high speed. Typically, the switch operates at the data link layer of a communications protocol stack (layer 2) in accordance with the IEEE 802.1D standard to receive a data packet at a source port that originated from a sending entity and forward that packet to at least one destination port for transfer to a receiving entity.

On the other hand, a router may be used to interconnect LANs executing different LAN standards and/or to provide higher level functionality than is typically provided by the switch. Routers typically operate at the network layer (layer 3) of a communications protocol stack, such as the Internet communications architecture protocol stack. The primary network layer protocol of the Internet architecture is the Internet protocol (IP) that provides internetwork routing and that relies on transport protocols for end-to-end reliability. An example of such a transport protocol is the Transmission Control protocol (TCP) contained within a transport layer (layer 4) of the Internet architecture. The term TCP/IP is commonly used to refer to the Internet architecture; the TCP/IP architecture is well known and described in *Computer Networks*, $3^{rd}$ Edition," by Andrew S. Tanenbaum, published by Prentice-Hall (1996).

It is generally common to configure switches that operate at layer 3 of the communications protocol stack and, in fact, switches may be further configured with the capability to examine information contained within a layer 4 header of a packet. This trend may lead to higher layer ("layer 4/7") switches that are capable of rendering decisions (e.g., forwarding and routing decisions) by analyzing higher layer (e.g., application layer 7) data. In order to perform such higher layer decision operations, the switch must be capable of fragmenting a packet to examine the information contained in its higher layer headers and then reassembling the packet prior to forwarding it to at least one of its destination ports. In the context of a TCP/IP networking environment, the fragmentation and reassembly procedure is well known and described in detail in the *Internet Protocol, Request for Comments* (RFC) 791, by Information Sciences Institute University of Southern California (1981), which disclosure is hereby incorporated by reference.

Fragmentation of an IP datagram (hereinafter referred to as a packet) is also necessary if the LAN standards associated with the source and destination entities are dissimilar (e.g., Ethernet and Token Ring). In this case, the switch may need to alter the format of the packet so that it may be received by the destination entity. For example, if a packet originates in a network that allows a large packet size and traverses one or more links or local networks that limit the packet to a smaller size, the switch interconnecting the networks must fragment the IP packet. According to RFC 791, IP fragmentation apportions an IP packet into an arbitrary number of fragments that can be later reassembled.

Figure 1:
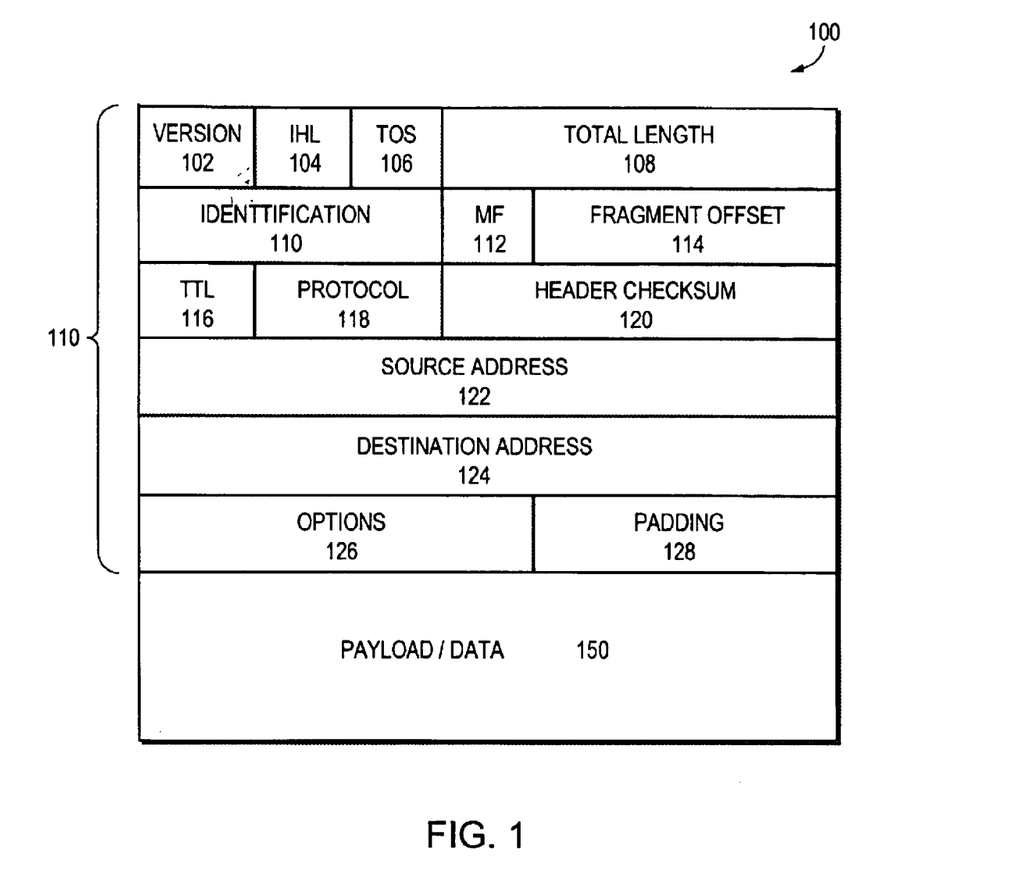
FIG. 1 is a schematic block diagram of an Internet protocol (IP) packet.

FIG. 1 is a schematic block diagram of an IP packet 100 comprising an IP header portion 110 and a payload/data portion 150. The IP header 110 comprises a version field 102 that indicates the format of the IP header, an Internet header length (IHL) field 104 that indicates the length of the Internet header and a type of service (TOS) field 106 that provides an indication of parameters of a desired quality of service. An IP total length field 108 specifies the length of the IP packet including the IP header and payload/data, while an IP identification field 110 specifies an identifying value assigned by the sending entity to aid in assembling the fragments of the packet.

The IP header further includes a more fragment (MF) flag 112, an IP fragment offset field 114 that specifies the placement of the fragment within the IP packet and a time to live (TTL) field 116 that indicates a maximum time the packet is allowed to remain in the network. A protocol field 118 indicates the next level protocol used in the payload/data portion 150 of the packet, while a header checksum field 120 provides a checksum on only the IP header. The IP header further includes a source address field 122 containing the IP source address of the sending entity and a destination address field 124 containing the IP destination address of the receiving entity, along with an options field 126 and a padding field 128.

To fragment an IP packet, an intermediate system (e.g., a switch) creates two or more new IP fragments and copies the contents of a portion of the IP header fields from the original packet into each of the IP headers of the fragments. The receiving entity of the fragments uses the contents of the IP identification field 110 to ensure that fragments of different packets are not mixed. That is, the identification field 110 is used to distinguish the fragments of one packet from those of another. The IP fragment offset field 114 informs the receiving entity about the position of a fragment in the original packet. The contents of the fragment offset field and the IP total length field 108 of each fragment determine the portion of the original packet covered by the fragment. The MF flag 112 indicates (e.g., when reset) the last fragment. The originating host of a complete IP packet sets the IP identification field 110 to a value that is unique for the source/destination address pair and protocol (e.g., TCP, UDP) for the time the packet will be active in the network. The originating host of the complete packet also sets the MF flag 112 to, e.g., zero and the IP fragment offset field 114 to zero.

The IP fragmentation and reassembly procedure is typically not performed by intermediate stations, but rather by host end stations in a network. For those intermediate stations (switches) that implement the procedure, the functions are typically performed in software using general-purpose processors. The amount of processing required to identify information inside an IP packet is substantial and a general-purpose processor may not have an architecture that is optimized to efficiently perform such processing. Moreover software implementation of IP packet reassembly introduces a critical bottleneck in packet processing operations at the switch.

In an IP network environment, higher layer (e.g., layer 4/7) switches must reassemble fragments traversing the network into the original packet before processing the packet. To reassemble the fragments of an IP packet, the switch or host end station typically pre-allocates a buffer and then combines fragments having a similar 4-tuple arrangement comprising {IP identification, IP source, IP destination and IP protocol} values. Reassembly of the fragments is performed by placing the data portion of each fragment in a relative position indicated by the IP fragment offset of that fragment's IP header. However, pre-allocation of a buffer is undesirable in an intermediate station because it results in inefficient use of memory due to the varying number of fragments/fragmented packets received at the switch and facilitates attacks by intruders ("hackers") that employ fragmentation to saturate resources (such as memory) of the switch.

SUMMARY OF THE INVENTION

The invention relates to an IP packet reassembly engine that provides high-speed and efficient reassembly of IP fragments received at an intermediate station in a computer network. The IP packet reassembly engine preferably comprises a main controller logic circuit configured to "speed-up" reassembly of original packets from IP fragments stored in a frame buffer at multi-gigabit per second rates. To that end, the reassembly engine further includes a content addressable memory (CAM) having a plurality of entries for maintaining status information for each received fragment and for each original packet being reassembled from the fragments.

In the illustrative embodiment, the main controller of the IP reassembly engine comprises, inter alia, a frame buffer controller that cooperates with queuing and dequeuing logic to store and retrieve fragments to/from queues of the frame buffer. An input queue data structure is provided within the main controller for managing the queues of the frame buffer. The main controller is responsible for deciding whether a packet received by the IP reassembly engine is complete by checking status information maintained by the CAM subsystem. The main controller also manages the CAM by deleting packet entries and all related fragment entries that have expired. This latter task is performed in accordance with a timer handling process that periodically compares a current time with an expiration time stored in an expiration time field of each CAM entry.

Specifically, the CAM subsystem stores information about the length of each packet currently being reassembled. That is, the CAM maintains information about the IP total length of each packet and the accumulated (i.e., current) length of all received fragments belonging to that packet. The information relating to these two length parameters indicate whether all fragments belonging to a particular packet have been received. The IP total length of the reassembled packet is derived from the last fragment of the packet by adding its IP fragment offset and its IP total length. Note that the last fragment may comprise the last received fragment or the fragment having a reset MF flag. When the current length equals the total length for a given packet, the reassembly process starts and the packet is assembled starting with its first fragment whose pointer to the frame buffer is stored in the CAM.

Operationally, a first lookup operation is performed in the CAM to find a first "offset zero" fragment of a packet using, for example, a class of service (COS) field and an input index (IDX) field as the lookup key. Once found, the contents of a pointer (PTR) field and a total length (TLEN) field are retrieved, along with information (i.e., IP destination, IP source, IP protocol and IP identification) stored in a 4-tuple field of the CAM. The pointer is used to retrieve the fragment from a queue in the frame buffer. All subsequent fragments of the packet are retrieved from the frame buffer based on a 4-tuple search of the CAM to obtain pointers to the respective queues in the buffer.

The fragments are reassembled into proper order within a packet by placing the data portion of each fragment in a relative position indicated by the IP fragment offset of each fragment. During reassembly of the packet, each lookup operation varies from the previous one by the fragment offset value, which is calculated as:

$$\text{FragmentOffset}_{n+1} = \text{FragmentOffset}_n + \text{IPTotalLength}_n$$

The reassembly process completes when the last fragment (i.e., the fragment having MF flag=0) has been added to the reassembled original packet. The time needed to reassemble a packet increases linearly with the number of fragments.

In summary, the IP reassembly logic engine is an efficient logic circuit, based on the use of a CAM, for implementing packet reassembly in an intermediate station, such as a layer 4/7 switch. Advantages of reassembling original packets at an intermediate station include (i) off-loading of the reassembly process from host end stations, (ii) the ability to defend a private LAN network from intruders/hackers, and (iii) the ability to perform higher layer (layer 4–7) operations. These latter operations include load balancing, web cache redirection and uniform resource locator (URL) inspection, along with filtering (access list) based on layer 4 (TCP) ports.

BRIEF DESCRIPTION OF THE DRAWINGS

The above and further advantages of the invention may be better understood by referring to the following description in conjunction with the accompanying drawings, in which like reference numbers indicated identical or functionally similar elements.

DETAILED DESCRIPTION OF THE ILLUSTRATIVE EMBODIMENTS

Figure 2:
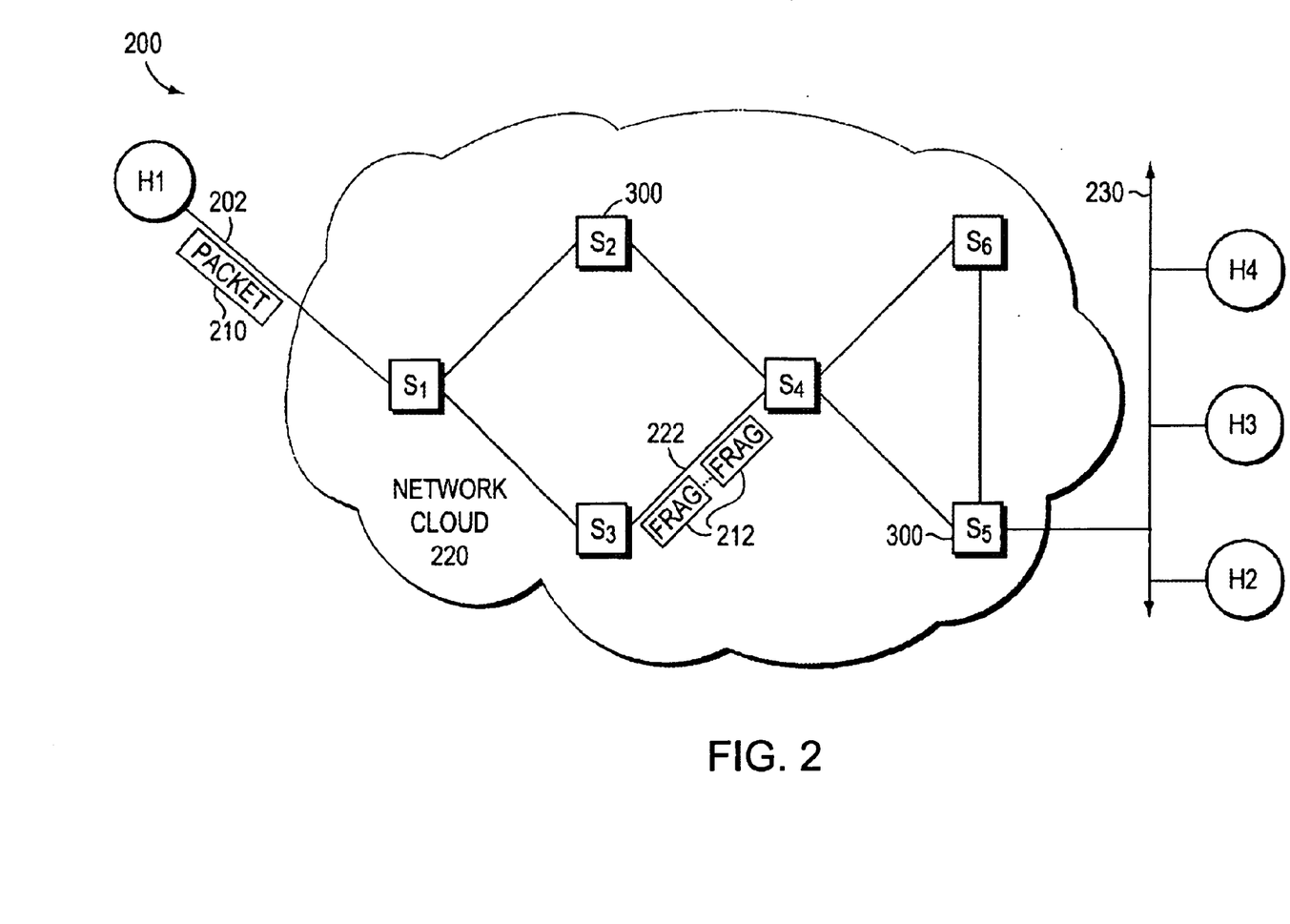
FIG. 2 is a schematic block diagram of a computer network comprising a plurality of host end stations interconnected by a plurality of intermediate stations, such as a network switch.

FIG. 2 is a block diagram of a computer network 200 comprising a collection of interconnected communication media attached to a plurality of stations. The stations are typically computers comprising end stations or hosts H1–H4 and intermediate stations 300. The intermediate stations are preferably network switches S1–S6, whereas the end stations H1–H6 may include personal computers or workstations. Each station typically comprises a plurality of interconnected elements, such as a processor, a memory and a network adapter. The memory may comprise storage locations addressable by the processor and adapter for storing software programs and data structures associated with the invention. The processor may comprise processing elements or logic for executing the software programs and manipulating the data structures. An operating system, portions of which are typically resident in memory and executed by the processor, functionally organizes the station by, inter alia, invoking network operations in support of software processes executing on the station. It will be apparent to those skilled in the art that other processor and memory means, including various computer readable media, may be used for storing and executing program instructions pertaining to the techniques described herein.

The communication media of network 200 preferably comprise local area networks (LANs), such as a Token Ring (TR) or Ethernet LANs, although the invention may work advantageously with communication links such as wide area network (WAN) links interconnecting the stations. Communication among the stations of the network is typically effected by exchanging discrete data frames or packets between the communicating stations according to a predefined protocol. For the illustrative embodiment described herein, the predefined protocol is the Transmission Control Protocol/Internet Protocol TCP/IP), although the invention could be implemented with other protocols, such as the OSI/ISO 8473 and IPv6 protocols.

In the illustrative embodiment, source host Hi communicates with destination host H2 coupled to private network 230 through a network cloud 220 of interconnected switches 300 by exchanging discrete frames or packets in accordance with the TCP/IP protocol. The maximum size of a packet sourced by H1 is dependent on the types and characteristics of the communication media and links coupling the source and destination host stations. For example, the maximum transfer unit (MTU) of a packet traversing a communication media, such as LAN 202 coupling H1 to switch S1, depends on the type of LAN. That is, the MTU of a packet traversing a TR LAN is 14 kilobytes (KB), whereas the MTU of a packet traversing an Ethernet LAN is 1500B. On the other hand, the MTU of a packet traversing a point-to-point link, such as link 222 connecting switch S3 and switch S4, is 576B.

Assume that LANs 202 and 230 are Ethernet LANs and that H1 transmits an Ethernet packet 210 over LAN 202 to switch S1, which forwards the packet to switch S3. If S3 renders a decision to forward the packet over link 222 to switch S4, then S3 apportions the packet 210 into smaller fragments 212 in accordance with the IP fragmentation and reassembly process defined in RFC 791. Since the packet is destined for host H2, switch S4 forwards the fragments 212 onto switch S5 that connects to H2 over Ethernet LAN 230.

Figure 3:
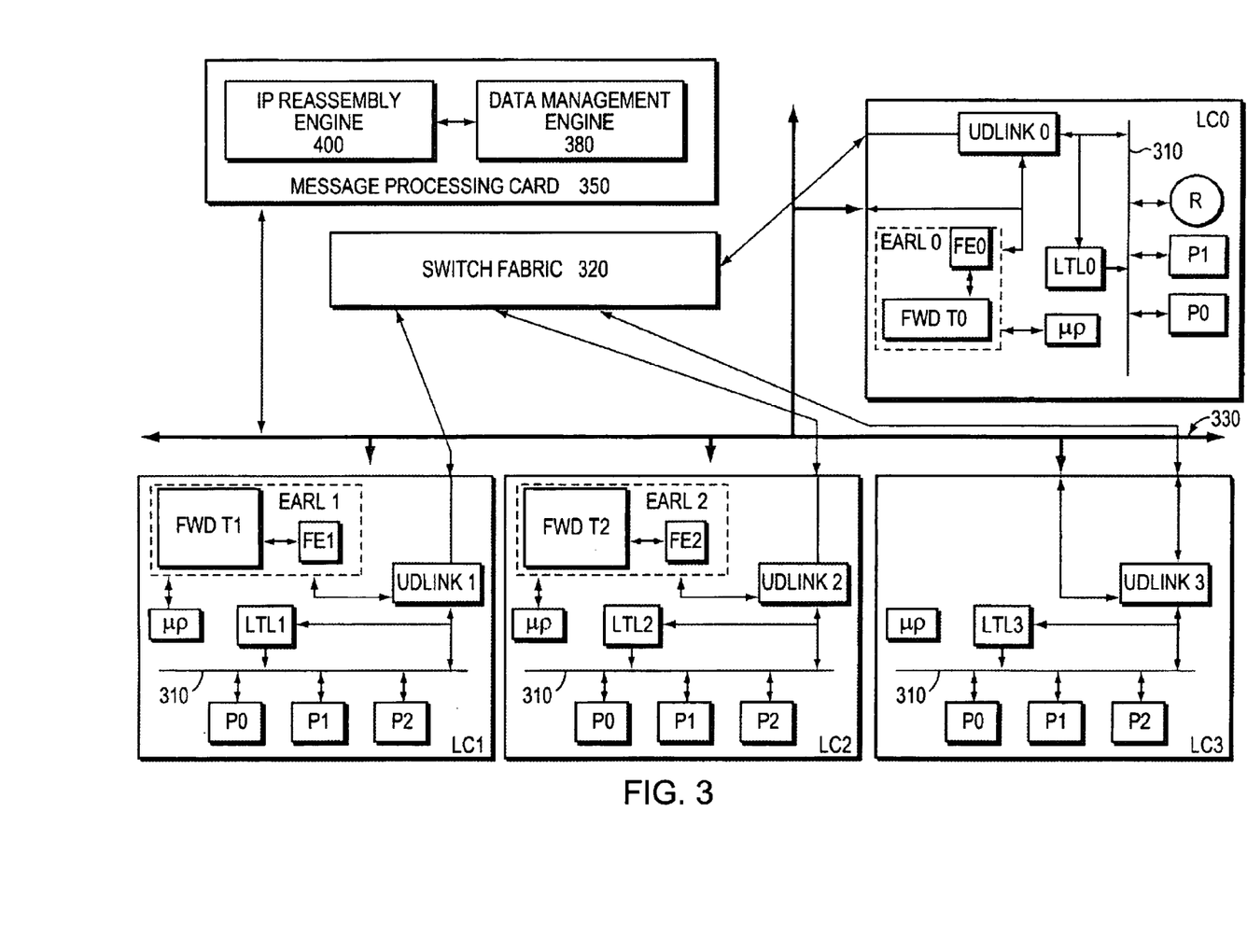
FIG. 3 is a schematic block diagram of a network switch that may be advantageously used with the present invention.

In computer network 200, S5 is the only switch within network cloud 220 connected to host H2; therefore, it may be useful to have switch S5 perform IP reassembly of the fragments 212 into original packet 210 prior to forwarding the data to host H2. In the illustrative embodiment described herein, the hosts H2–H4 may comprise a web site coupled to a private LAN 230 via switch S5. FIG. 3 is a schematic block diagram of a network switch 300 that may be advantageously used with the present invention. The network switch S5 is preferably configured as a layer 4/7 switch having a software routing component and hardware components distributed among a plurality of line cards (LCO-3) that are interconnected by a switch fabric 320. One of the line cards, denoted LCO, is a switch management card (SMC) that includes an internal router (R) of the switch. The internal router may be embodied as a routing process executing in the internetwork layer (layer 3) or transport layer (layer 4) of a conventional protocol stack.

Each line card comprises a plurality of ports P (e.g., P0–P2), a local target logic (LTL) memory and an up/down link (UDlink) interface circuit interconnected by a local bus 310. Each line card further contains a microprocessor ($\mu p$) in communicating relation with all of its "peer" microprocessors in switch 300 over a management bus (not shown). Some of the line cards may comprise self-contained "mini-switches" that are capable of rendering forwarding decision operations for data frame traffic switched by the fabric 320; that is, forwarding decisions implemented by the switch fabric may be provided by some line cards. Each of these cards includes an encoded address recognition logic (EARL) circuit coupled to the UDlink and microprocessor. The EARL executes all forwarding decisions for its associated line card(s), while the LTL implements those forwarding decisions by selecting ports as destinations for receiving data (in the form of frames or packets) transferred over the local bus. To that end, the EARL contains forwarding engine circuitry (FE) and at least one forwarding table (FwdT) configured to produce a unique destination port index value.

The switch fabric 320 is preferably a switching matrix employed to control the transfer of data among the line cards of the switch 300. The UDlink provides an interface between the local bus 310 on each line card and the switch fabric 320. Inputs to the LTL logic are received over the local bus 310, which is driven by the UDlink. By employing the UDlink in this manner, a line card (e.g., LCO-2) may include both an EARL circuit and a UDlink or it may share the EARL contained on another line card. In this latter case, a common bus 330 enables a line card without a forwarding engine (e.g., LC3) to use the forwarding engine (e.g., EARL 0) on another line card, such as the SMC. For those line cards without a forwarding engine, the UDlink also provides a connection to the common bus 330. The common bus 330 further enables the line cards to interact with a high-speed message processing card 350 by exchanging data over the bus 330.

The format of data between each line card and the switch fabric is generally similar to that employed over the local bus. For example, the format of data transferred from each line card to the switch fabric (hereinafter referred to as a "fabric frame") includes bit mask information instructing the switch fabric 320 where to forward the frame and other information, such as class of service (COS) information, used by the switch. This information, which is also included on fabric frames traversing the local bus 310, is embedded within a header of each frame.

Suitable intermediate network device platforms for use with the present invention include the commercially available Catalyst 4000, 5000 and 6000 series of switches from Cisco Systems, Inc., along with the intermediate network device disclosed in copending and commonly assigned U.S. patent application Ser. No. 09/469,062 titled, *Method and Apparatus for Updating and Synchronizing Forwarding Tables in a Distributed Network Switch* by Thomas J. Edsall et al.

The layer 4/7 switch S5 preferably functions as a border gateway to private LAN 230. In addition, switch S5 may function as a firewall and a load balancer that analyzes higher layer headers (e.g., layer 4 header) and data (e.g., layer 7 application data) of the packet 210 during the IP reassembly process. In the former case, a firewall engine of switch analyzes the fragments 212 to counter attacks by potential intruders/hackers, whereas in the latter case, a load balancer function analyzes the fragments to direct the packet to an appropriate host station H2–H4 when balancing the load of the web site. Typically, a switch that is configured to perform such higher layer functions implements the IP reassembly processing in software; such processing is generally inefficient and results in a bottleneck within the switch. The present invention is directed to an IP reassembly engine that efficiently performs reassembly of IP fragments received at an intermediate station in a computer network.

Figure 4:
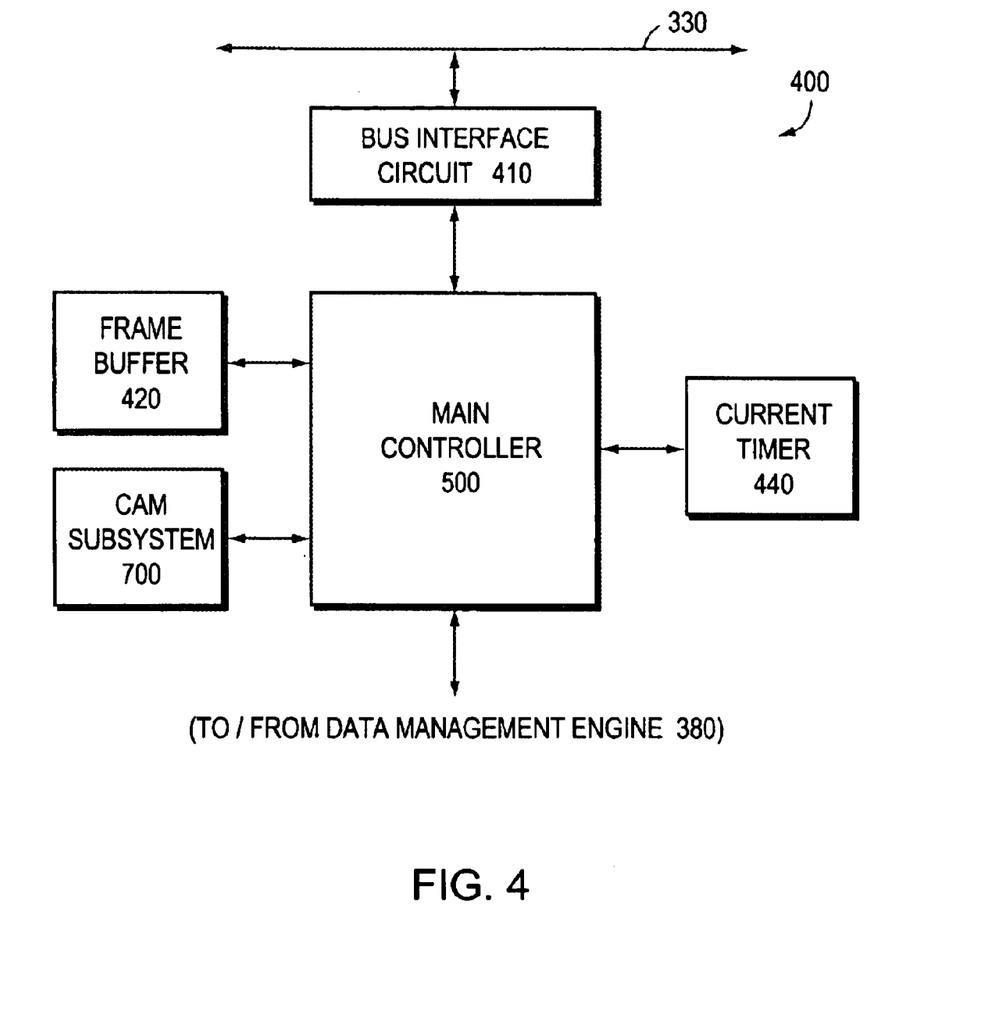
FIG. 4 is a schematic block diagram of a novel IP reassembly engine including a frame buffer and a CAM subsystem interconnected by a main controller in accordance with the present invention.

In the illustrative embodiment, the IP packet reassembly engine 400 is preferably a logic circuit coupled to a data management engine 380 on the message processing card 350. The reassembly engine is configured to "speed-up" reassembly of original packets from IP fragments at multi-gigabit per second rates; to that end, the reassembly engine comprises, inter alia, a content addressable memory (CAM) used to store packet and fragment information, and to reassemble original packets from the fragments.

FIG. 4 is a schematic block diagram of the IP reassembly engine 400 comprising a bus interface circuit 410, a frame buffer 420 and a CAM subsystem 700 interconnected by a main controller 500. Broadly stated, a fabric frame transmitted over the common bus 330 and destined for the IP reassembly engine 400 is received at the interface circuit 410 which performs a rewrite operation (if necessary) and then forwards the frame to the main controller 500. The term "fabric frame" is used herein to denote the internal format of a layer 2 frame that may contain an IP packet which, in turn, may also comprise an IP fragment. The controller 500 stores the received frame in the frame buffer 420 and creates an entry in the CAM subsystem 700 that identifies the fabric frame and its location in the buffer 420. In the illustrative embodiment described herein, the CAM subsystem 700 comprises eight (8) CAM devices, preferably organized as a 256 K×144-bit array, and a 256 MB SRAM memory. Although the memory used in subsystem 700 is illustratively a content addressable memory, it will be apparent to those skilled in the art that other memory devices, such as a ternary CAM (TCAM) or a link list implemented in RAM, may be advantageously used with the present invention.

Figure 5:
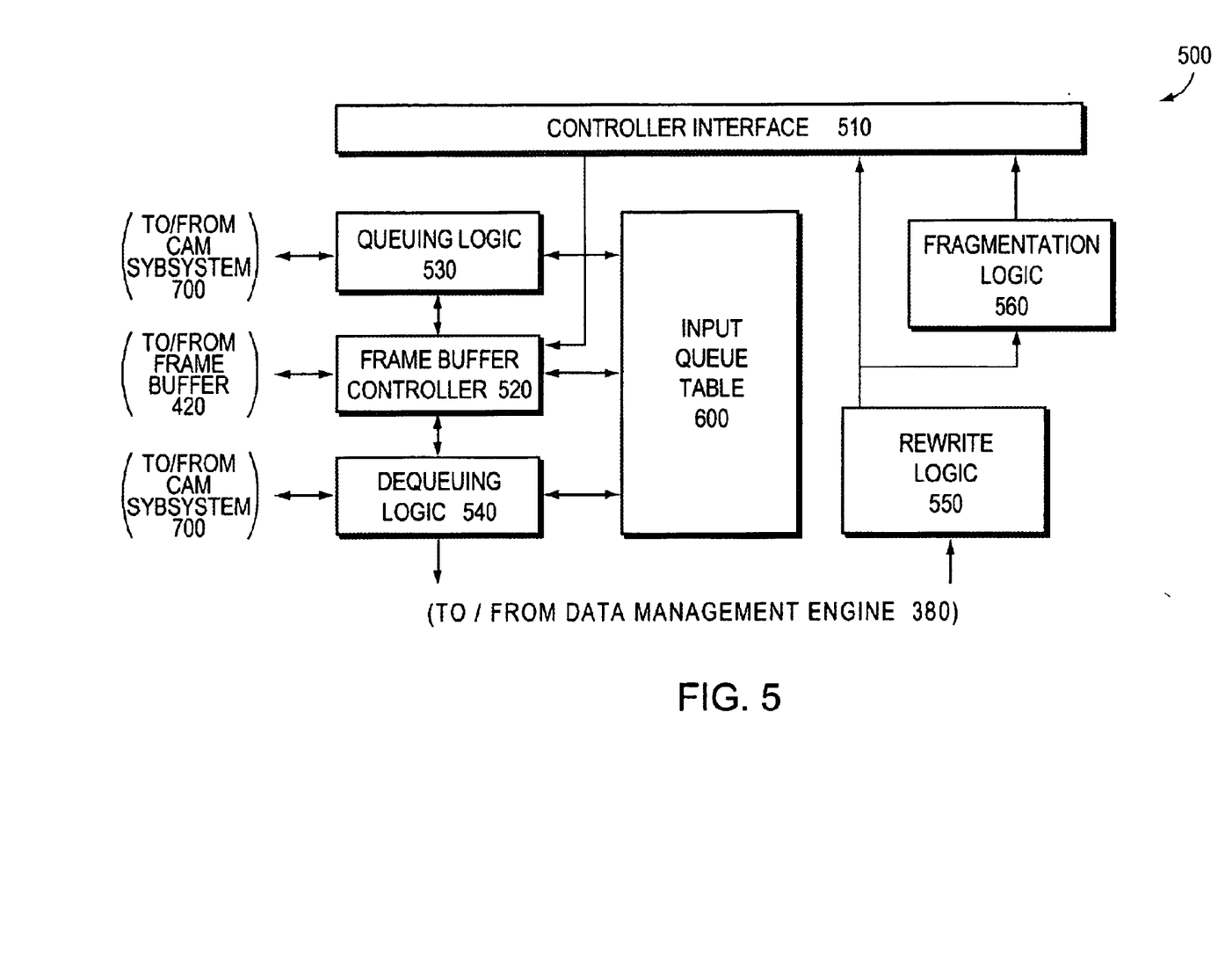
FIG. 5 is a schematic block diagram of the main controller including an input queue table in accordance with the invention.

FIG. 5 is a schematic block diagram of the main controller 500 comprising logic circuitry that is preferably implemented as an application specific integrated circuit (ASIC). The logic circuitry generally includes, inter alia, an arithmetic logic unit, various comparators and logic circuitry for performing read/write operations and check functions as described herein. In partcular, the circuitry comprises a controller interface circuit 510 that interacts with the bus interface circuit 410 to receive fabric frames (e.g., up to 16 KB in length) from the common bus 330 at, e.g., 16 Gbps and transmit such frames to the bus at, e.g., 8 Gbps. A frame buffer controller 520 cooperates with queuing logic 530 and dequeuing logic 540 to store and retrieve fabric frames to/from the frame buffer 420. The frame buffer 420 is illustratively a 256 MB synchronous dynamic random access memory (SDRAM) organized into eight (8) queues based on the contents of the COS fields of the received frames. To that end, the controller 500 further includes an input queue data structure, e.g., a table 600, for managing the queues of the frame buffer 420.

Broadly stated, the main controller is responsible for deciding whether a packet (in the form of fabric frame) received by the IP reassembly engine 400 is complete. To that end, the main controller updates (i.e., accesses and modifies) the CAM subsystem when a new fragment (in the form of a fabric frame) is received. The main controller 500 further reassembles fragments into packets, performs multiple lookups in the CAM sub-system 700, and extracts corresponding fragments from the frame buffer 420. Moreover, the controller decides whether a packet is complete by periodically checking the CAM 700 to delete packet entries and all related fragment entries that have expired. This latter task is preferably performed through periodical comparisons of the current time stored in a current timer 440 with the expiration time stored in an expiration time field (FIG. 7 at 732) for each packet.

Figure 7:
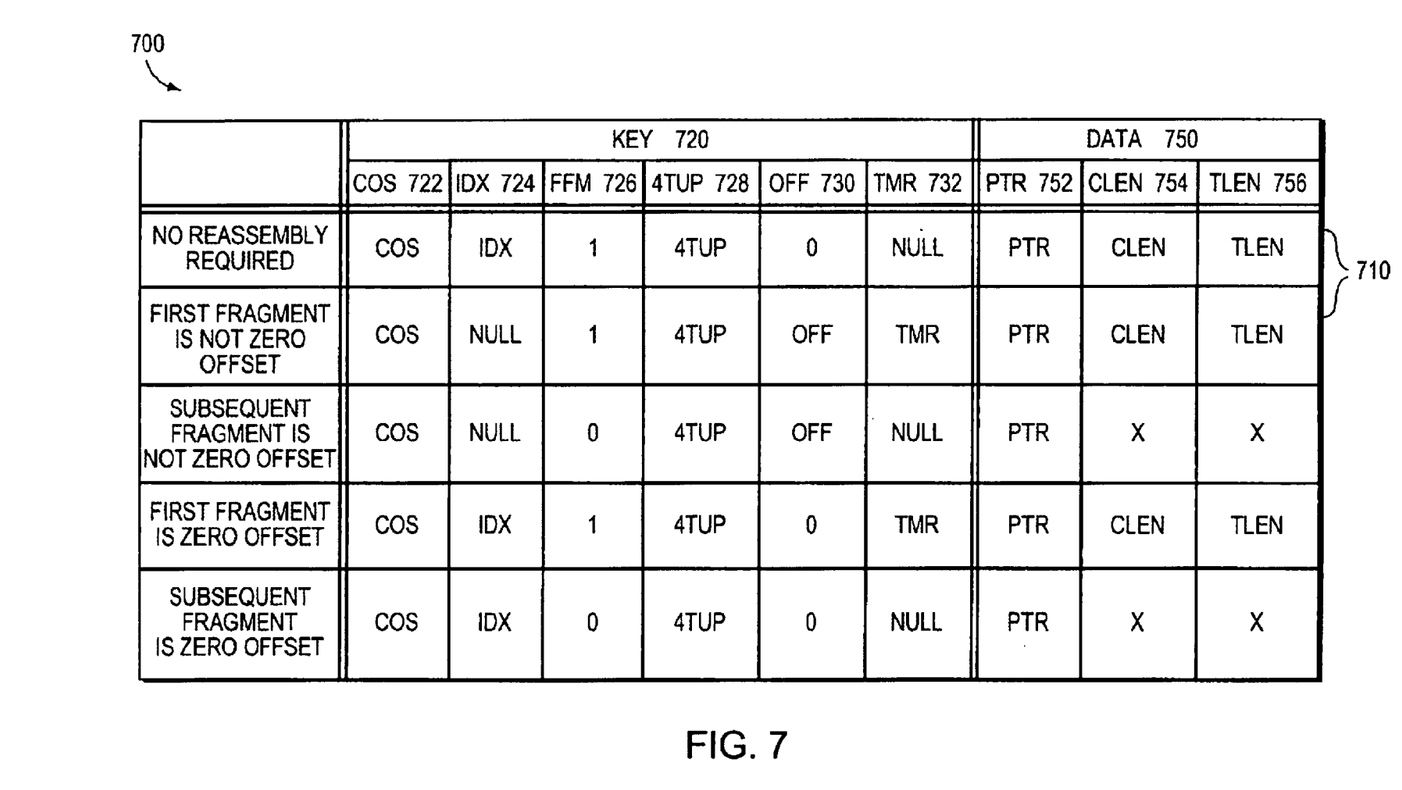
FIG. 7 is a schematic block diagram of the CAM subsystem of FIG. 4.

Specifically, the main controller 500 is responsible for timer handling such that each time a first fragment 212 belonging to a new packet 210 is received, the IP reassembly engine 400 starts a "reassembly timer" for that packet. The reassembly timer is configured by setting a corresponding expiration time value in field 732 to the current time contained in the current timer 440 plus a configurable time out value. Each time the current time is incremented, the main controller searches the CAM 700 for all packet entries having an expiration time value 732 equal to the current time 440. Those entries that have matching time values are deleted from the CAM subsystem.

If the received fabric frame is not a fragment, the main controller 500 "stages" the frame in the buffer 420 for immediate forwarding to the data mangement engine 380. However if the received fabric frame is a fragment of a fragmented packet, the controller waits until all fragments of the fragmented packet are received prior to removing them from the frame buffer. At that time, the main controller 500 (re)assembles the fragments in the proper order by placing the data portion of each fragment in a relative position indicated by the IP fragment offset of each fragment and stages the completed packet for forwarding to the data mangement engine. When the data management engine 380 returns a packet to the engine 400, a rewrite logic circuit 550 may perform an optional rewrite operation on certain fields of the packet. If necessary, a fragmentation logic circuit 560 fragments the packet and sends the fragments to the common bus 330 via the bus interface circuit 410.

Figure 6:
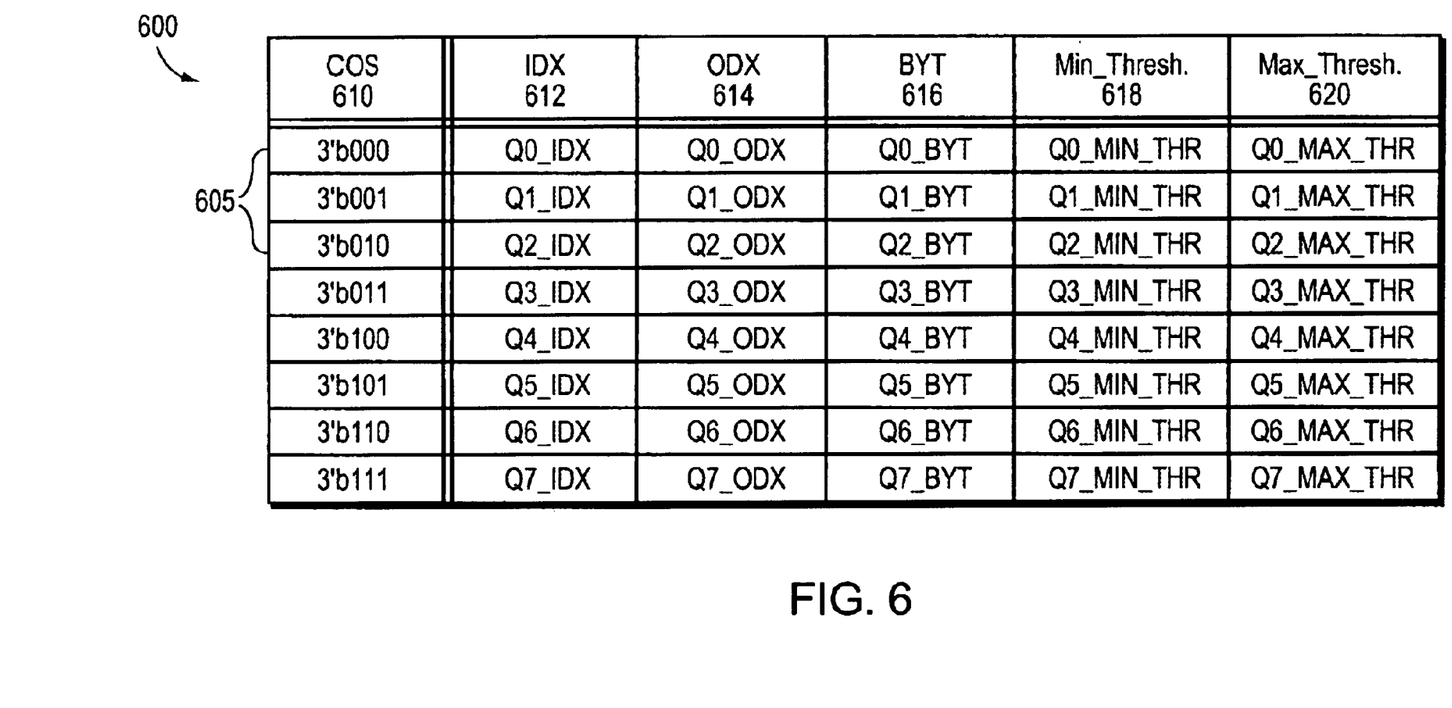
FIG. 6 is a schematic block diagram of the input queue table of FIG. 5.

FIG. 6 is a schematic block diagram of the input queue table 600 comprising a plurality of input queue entries 605, each of which corresponds to a frame buffer queue. Each entry 605 illustratively includes an input index (IDX) 612, an output index (ODX) 614, a byte count (BYT) 616, a minimum threshold (MIN_THRESH) value 618 and a maximum threshold (MAX_THRESH) value 620. The input index 612 and output index 614 are maintained for each COS value 610, whereas the byte count 616 and minimum/maximum threshold values 618, 620 for each queue are maintained to support various queuing algorithms used to, e.g., drop frames when the queue becomes full. This may be particularly useful to control denial of service attacks.

FIG. 7 is a schematic block diagram of the CAM subsystem 700 that maintains information related to the fabric frames stored in the frame buffer 420. The subsystem comprises a plurality of entries 710, each of which includes a key section 720 used for look-up operations into the subsystem and a data section 750. The key section 720 includes a COS field 722 having a value that is obtained from a received frame and populated when the entry 710 is created. An IDX field 724 contains a value indicating the current position of an input queue pointer for the queue that has been assigned to the frame. The IDX value is preferably a relative value that, in conjunction with the COS value, identifies a first fragment and indicates when the fragments are ready for reassembly. In the illustrative embodiment, only a zero offset fragment has a valid IDX field 724; the IDX fields for all subsequent fragments are assigned NULL values until those fragments have been received by the controller 500.

The key section 720 also includes a first frame marker (FFM) field 726 whose content marks the first fabric frame received at the engine 400. It should be noted that the first frame may (or may not) be a fragment and, if it is a fragment, it may (or may not) be the zero offset fragment. The FFM field 726 is asserted (set to "1") when the first fragment entry is created and, as described further herein, identifies an entry that holds valid timer, current length and total length fields. A 4-tuple (4TUP) field 728 contains an identifier for reassembly of a fragmented packet stored in the frame buffer 420. The identifier preferably comprises a concatentation of the 4-tuple values {IP identification, IP source, IP destination and IP protocol} contained in the IP header of each frame. An offset (OFF) field 730 contains an offset of the fragment, while a timer (TMR) field 732 contains a value indicating an expiration time of the reassembly process.

As noted, only those entries 710 with their FFM bits 726 asserted have valid TMR values. A TMR value is calculated by adding a timeout (expiration) value to a current time value. After all fragments have been received by the controller 500, the TMR value is reset to a NULL value. If the current time increments to the TMR value, the reassembly process for the fragment packet identified by the 4TUP field 728 is terminated and all CAM entries 710 for that process are invalidated.

The data section 750 of an entry 710 comprises a pointer (PTR) field 752 that contains an address of a fragment stored in the frame buffer 420. A current length (CLEN) field 754 contains the sum of lengths of all frame fragments that have been received at the engine 400. The CLEN field is populated when the first fragment entry is created and is then updated as each subsequent frame fragment arrives at the engine. A total length (TLEN) field 756 contains the total length of a reassembled fragmented packet. The TLEN field is populated with a zero value when the first fragment entry is created and is updated with a valid value when the fragment carrying the total length (i.e., the fragment with MF=0) is received. The fields 754, 756 are only valid for a first fragment and, as noted, only those entries 710 with their FFM bits 726 asserted have valid CLEN and TLEN values.

Refer now to FIGS. 4–7 for a description of the operation of the IP reassembly engine 400. Fabric frames received at the interface circuits 410, 510 are stored in the frame buffer 420 by the flame buffer controller 520. The queuing logic 530 assigns each received frame a current value of the IDX and then increments that index. The queuing logic also creates an entry 710 in the CAM subsystem 700 for the frame. For frames (fragments) that require reassembly, the logic 530 determines when all fragments of a reassembly (fragmented packet) have been received before assigning the IDX value; accordingly, the IDX applies to the entire group of frame fragments that will be subsequently reassembled. A frame that does not require reassembly, however, is assigned a unique index value.

The dequeuing logic 540 determines when to retrieve fabric frames from the frame buffer 420, preferably in accordance with a predetermined priority policy. When retrieving a frame (or group of frame fragments) from the frame buffer 420, the dequeuing logic 540 preferably searches for a particular COS and ODX combination in the table 600. Upon finding an entry 605 that matches the combination, the controller 520 reads the frame(s) from the buffer 420 and provides them to the dequeuing logic 540. The dequeuing logic 540 invalidates the entries 710 corresponding to the retrieved frames from the CAM subsystem 700, performs a reassembly operation (if necessary) on the retrieved frames, sends the reassembled packet to the data management engine 380 and increments the ODX. Incrementing of the ODX in this manner allows that index to "catch-up" with the IDX. When the ODX equals the IDX, the corresponding queue is empty.

In accordance with the invention, the packet reassembly process takes place when the packet total length (TLEN) value in field 756 equals the packet current length (CLEN) value stored in field 754 of the CAM subsystem 700. In this case, the CAM subsystem 700 is searched for references to all fragments 212 belonging to the particular packet 210 that is to be reassembled. The first fragment of this packet is identified as having the fragment offset value in field 114 of its header equal to zero; this "zero offset" fragment is identified by a predetermined COS value and a valid IDX field 724. Note that a fragment 212 may be distinguished from a packet 210 based on the states of the MF flag 112 and the fragment offset field 114.

Specifically, if the MF flag 112 is asserted (e.g., "1") and the fragment offset field 114 is not asserted (e.g., "0"), then the fabric frame received by the engine 400 is a first fragment of a fragmented packet. If the MF flag is asserted and fragment offset is not equal to zero, then the frame is a fragment of a fragmented packet, but it is not the first or the last fragment. On the other hand, if MF flag is not asserted and fragment offset is not equal to zero, then the frame is the last fragment of a fragmented packet. Lastly, if the MF flag is not asserted and the fragment offset equals zero, then the fabric frame is not a fragmented packet but is, in fact, an entire (whole) packet.

Referring again to FIG. 1, the content of the IP total length field 108 specifies the total length of a current packet (in the case of a whole packet) or fragment (in the case of a fragmented packet). If the IP reassembly engine 400 is receiving fragments 212, the engine may determine the total length of the original packet by examining the last fragment and extracting the IP total length from field 108 along with the IP fragment offset from field 114 of the IP header 110. More specifically, the total length of the original packet may be determined as follows:

$$IPTotalLength_{originalpacket} = IPTotalLength_{lastfragment} + IPFragOffset_{lastfragment}$$

For each subsequent fragment 212 received by the IP reassembly engine 400, the main controller 500 uses the pointer (PTR) to the frame buffer 420 contained in field 752 of the CAM subsystem 700 to extract the IP total length of the fragment from field 108 of the IP header 110. According to the invention, the IP fragment offset stored in field 114 of the next fragment may be determined in accordance with the following equation (algorithm) by adding the IP total length of field 108 to the IP fragment offset of field 114 of the current fragment:

$$FragmentOffset_{n+1} = FragmentOffset_n + IPTotalLength_n$$

The process described above continues until a fragment 212 is received having the fragment offset in field 114 not equal to zero and the MF flag 112 equal to zero (i.e, the last fragment of the packet).

According to RFC 791, all fragments 212 belonging to the same original packet 210 are identified by a 4-tuple arrangement comprising the IP source address 122, the IP destination address 124, the IP identification 110 and the IP protocol type 118. The IP protocol type 118 is an 8-bit field specifying the layer 4 protocol (TCP, UDP or other layer 4 protocol) contained within the layer 3 packet. Thus, if an intermediate station (such as switch or router) apportions a packet into a number of fragments, each fragment contains the same information in each of these 4-tuple fields. However, during fragmentation, the switch changes the states of the fields in the MF flag 112 and the IP fragment offset 114. Portions of this information are stored within entries of the CAM subsystem.

In an embodiment of the present invention each time a new fragment 212 arrives at the reassembly engine 400, the contents of the 4-tuple fields, the MF flag and the IP fragment offset field are attached to the front of the fragment. The main controller 500 uses the attached 4-tuple contents to perform a lookup operation into the CAM subsystem 700. If no entry matches the 4-tuple, the main controller 500 creates a new entry 710 for the frame the CAM subsystem and associates a pointer to the fragment/packet information stored in the frame buffer 420.

If the main controller 500 receives a last fragment 212 of a packet 210 (i.e., the fragment with the MF flag 112 not asserted), then the IP total length of the original packet is set to the sum of the IP total length 108 and the IP fragment offset 114 of the last fragment 212. Note that the last fragment is the only fragment carrying information about the total length of the packet 210. Each time the packet current length CLEN 754 is updated in the CAM subsystem 700, the updated value is compared with the packet total length (TLEN) 756 in the same entry 710. If the CLEN 754 is less than the TLEN 756, the packet is incomplete (additional fragments are needed before the reassembly process can begin) and a new fragment 212 is examined by the engine 400. If the CLEN 754 is greater than the TLEN 756, and the packet total length is not zero, then an abnormal situation has arisen in the network and all fragments 212 of the packet 210 are preferably discarded. Otherwise, if the CLEN 754 is equal to the TLEN 756, it is assumed that all fragments 212 have been received and the reassembly process can take place.

According to the invention, the approach (i.e., algorithm) described herein for computing the fragment offset of the next fragment is not typically used to reassemble fragments according to the IP reassembly process. Typically, the IP reassembly process comprises (i) pre-allocating a buffer and (ii) storing all fragments in appropriate positions within that buffer. As noted, IP reassembly usually takes place in host stations as opposed to intermediate stations. However, pre-allocation of buffers within an intermediate station results in inefficient use of memory primarily due to the varying number of fragments/fragmented packets received at the station. In addition, static pre-allocation of buffers facilitates attacks by intruders/hackers by making it easier to saturate resources of the intermediate station. Thus, the fragment offset algorithm used in accordance with the present invention enables efficient use of resources in an intermediate station while also providing safeguards/security features for the switch.

Further advantages of performing IP reassembly in an intermediate station include the ability to perform operations on a layer 4 header of a packet which, in turn, enables load balancing, web cache redirection and URL inspection operations at the station. In addition, the IP reassembly function allows the station to perform access list filtering based on layer 4 (TCP) ports. The TCP port information is contained in the IP payload/data 150 and a way to obtain that information is to perform IP reassembly process at the switch.

Figure 8:
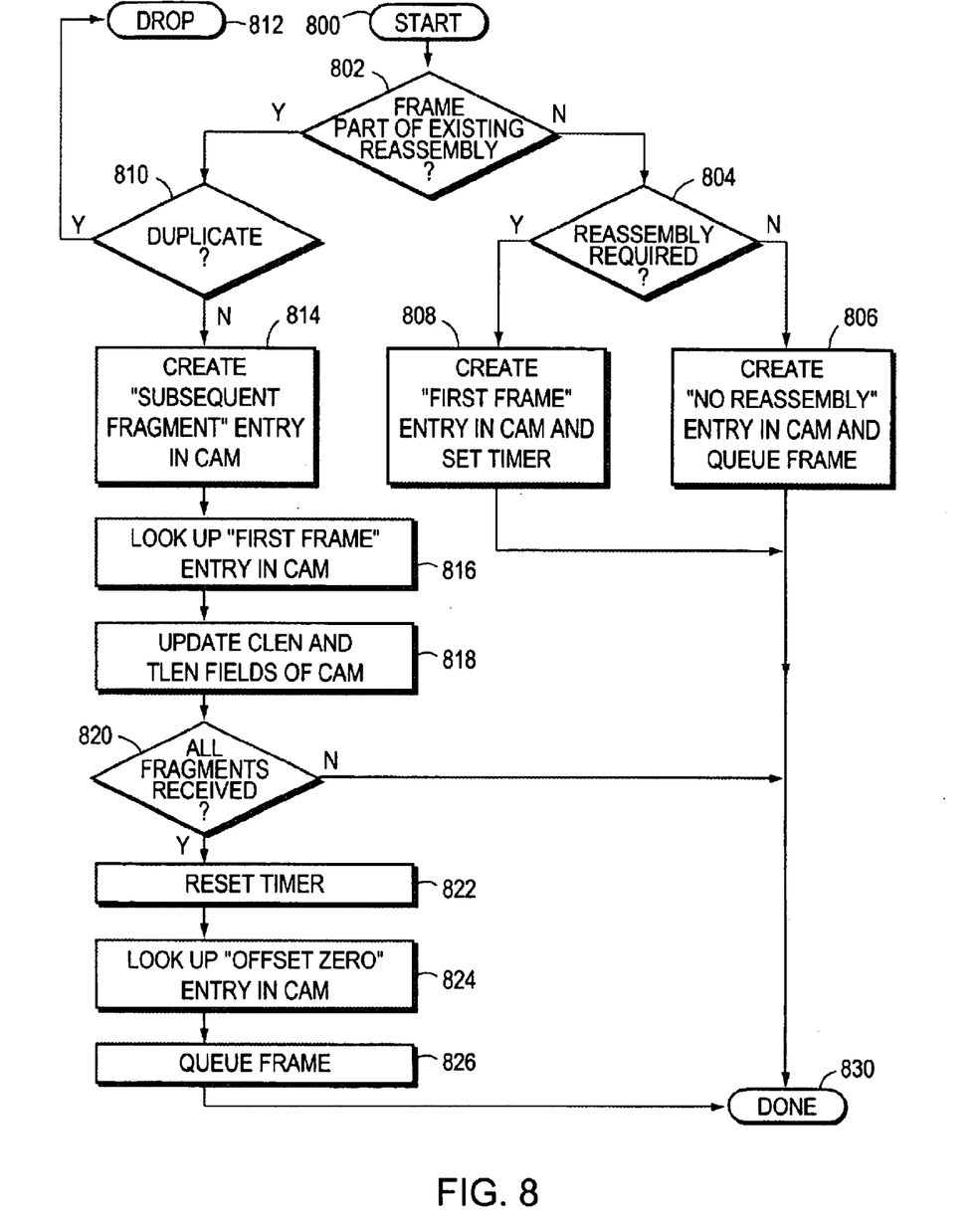
FIG. 8 is a flow chart illustrating a process used by the IP reassembly engine when storing frames in the frame buffer of FIG. 4.

FIG. 8 is a flow chart of an illustrative process employed by the IP reassembly engine 400 when storing frames in the frame buffer 420. The process begins at Step 800 and proceeds to Step 802 where a determination is made whether the frame is part of an existing reassembly (fragmented packet) taking place in the engine 400. To determine whether the frame is part of an exisiting reassembly, the main controller 500 performs a look-up operation into the CAM subsystem 700 based on the 4-tuple values retrieved from the frame/packet. If there is a matching entry, the controller also determines whether the FFM field 726 is asserted for that entry.

If the frame is not part of an existing reassembly, the process proceeds to Step 804 where a determination is made whether the frame is a fragment and, thus, requires reassembly. Here, the length of the frame (packet) updated to the current length CLEN 754 of an appropriate entry in the subsystem 700 and the updated value is compared with the packet total length (TLEN) 756 in the same entry 710. If the CLEN 754 is equal to the TLEN 756, then frame does not require reassembly, a "no reassembly" entry is created in the CAM subsystem, the various key and data fields of the entry are loaded with appropriate values and the frame is queued for retrieval (Step 806). However if the MF flag 112 is not asserted ("0"), the TLEN 756 is set to the sum of CLEN 754 and the OFF 730 and reassembly is required; accordingly, in Step 808 a "first flame" entry is created in the CAM (with appropriate key and data field values) and an expiration timer in TMR field 732 is set. The process then ends at Step 830.

If the frame is part of an existing reassembly (Step 802), a determination is made in Step 810 as to whether the frame is a duplicate by performing a lookup in the CAM using the contents of the 4-tuple and offset fields retrieved from the frame/packet. If so, the frame is dropped in Step 812; otherwise, a "subsequent fragment" entry is created in the CAM subsystem (with appropriate key and data field values) in Step 814. In Step 816, a look-up operation is performed into the CAM subsystem to find the "first frame" entry having the same 4-tuple field contents as those retrieved from the frame/packet and an asserted FFM field 726. In Step 818, the CLEN and TLEN fields are updated for that entry.

In Step 820, a determination is made as to whether all fragments have been received at the engine 400. Here, the CLEN 754 of the appropriate entry 710 is updated to the sum of the current CLEN value and length of the frame (packet).

If not all fragments have been received, the process ends at Step 830. If the CLEN 754 is equal to the TLEN 756, then all fragments have been received (Step 820), the expiration timer (TMR) field is reset (to NULL) in Step 822 and a lookup operation is performed to find the "offset zero" entry in the CAM 700 (Step 824) using the contents of the 4-tuple fields retrieved from the frame/packet and an offset value of zero. If the lookup results in a "miss" an error occurs; otherwise, the packet is queued for retrieval in Step 826. The process then ends in Step 830.

Figure 9:
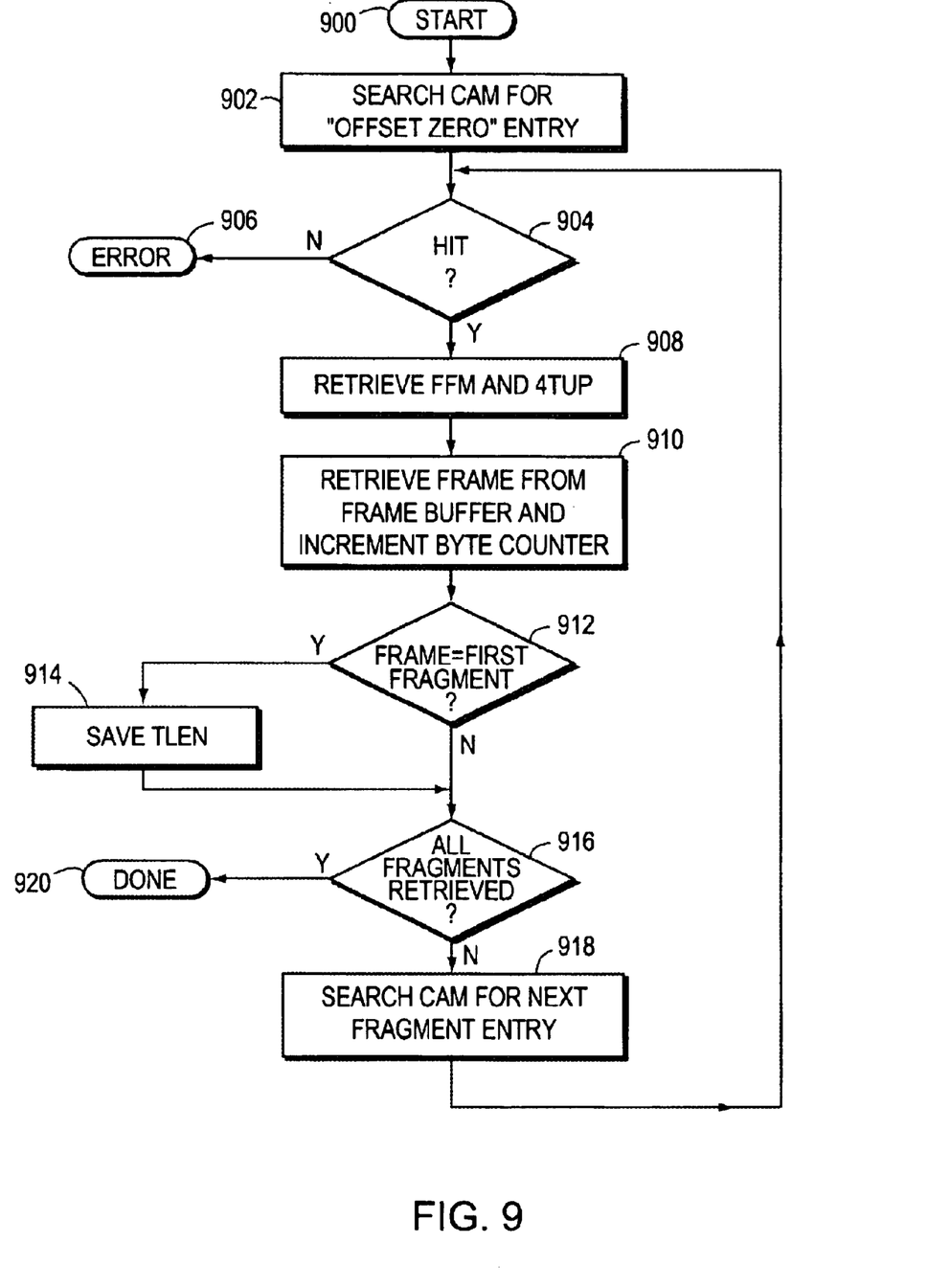
FIG. 9 is a flow chart illustrating a process used by the IP reassembly engine when reassembling frames of a fragmented packet.

FIG. 9 is a flow chart of an illustrative process used by the IP reassembly engine 400 when reassembling frames of a fragmented packet. The process begins at Step 900 and proceeds to Step 902 where the CAM subsystem 700 is searched for the "offset zero" fragment entry based on predetermined values of the COS and IDX fields 722, 724. If the entry is not found (Step 904), an error occurs in Step 906; otherwise, the contents of the FFM field 726 and the 4TUP field 728 are retrieved from the key section 720 of the CAM 700 in Step 908.

In Step 910, the pointer in PTR field 752 is used to retrieve the fragment from a queue in the frame buffer 420 and the content of the BYT field 616 of an input queue entry in table 600 corresponding to the queue is incremented. In Step 912, a determination is made as to whether the frame is the first fragment of a fragmented packet and, if so, the total length (TLEN) of the fragment is retrieved from field 108 of the fragment's IP header 110. In Step 916, a determination is made as to whether all fragments have been retrieved for this reassembly. If so, the process ends at Step 920; otherwise, the CAM 700 is searched for a next fragment entry associated with the reassembly (Step 918) and the process returns to Step 904.

Another aspect of the present invention involves the use of the CAM to perform efficient timer handling for purposes of aging entries in the CAM subsystem. As noted, each entry 710 of the CAM 700 includes an expiration time (TMR) field 732 containing an absolute aging time for that particular packet/fragment. That is, the value of the expiration time loaded into field 732 denotes the absolute time at which that packet must be deleted. The current timer 440 may be implemented as a counter such that every time the current time is incremented, the main controller performs a look-up operation into the CAM 700 to compare the current time with the expiration time.

In an embodiment of the present invention, the 4-tuple field 728 may be masked within each entry 710 and the current timer 440 compared with the expiration time value stored in field 732. When the current time equals the expiration time, the 4-tuple information field 728 is extracted and all entries having the 4-tuple are deleted from the CAM. This ensures that there are no aged entries in the CAM relating to fragments that may be lost in the network. The use of a CAM to implement a timer handling process allows the switch to achieve high-speed handling of millions of packets/fragments per second. The timer handling process is preferably a background process executing on the switch. In the illustrative embodiment, those entries having the 4-tuple information are deleted when the expiration time equals the current time. In an alternate embodiment of the invention, however, IP reasssembly may still occur when the expiration time equals the current time; in this embodiment, when the current time exceeds the expiration time, all entries having the 4-tuple information are deleted.

In summary, the invention involves a technique to perform IP reassembly of fragments for many packets at high-speed using a hardware assembly engine. The use of a CAM offers a simple and efficient way to handle IP reassembly of fragments, including implementing an expiration timer per packet. It should be noted, however, that hardware implementation of the IP reassembly process is possible without the use of such a CAM.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. Apparatus for providing high-speed and efficient reassembly of fragments received at an intermediate station in a computer network, the apparatus comprising:
   a frame buffer organized into a plurality of queues for storing the fragments;
   a main controller coupled to the frame buffer and configured to reassemble an original packet from the fragments at multi-gigabit per second rates; and
   a content addressable memory (CAM) subsystem coupled to the main controller, the CAM subsystem having a plurality of entries, each entry maintaining status information for each fragment received at the intermediate station.

2. The apparatus of claim 1 wherein the fragments received at the intermediate station are Internet Protocol (IP) fragments.

3. The apparatus of claim 2 wherein at least one entry of the CAM subsystem maintains information about an IP total length of each original packet reassembled by the main controller and a current length of each received fragment belonging to the packet.

4. The apparatus of claim 3 wherein the information relating to the IP total length and current length indicate whether all fragments belonging to the original packet have been received by the intermediate station.

5. The apparatus of claim 4 wherein the IP total length of the reassembled original packet equals a sum of an IP fragment offset of a last fragment of the packet and the IP total length of the last fragment.

6. The apparatus of claim 5 wherein a reassembly process of the intermediate station begins when the current length of the original packet equals the total length of that packet.

7. The apparatus of claim 6 wherein the original packet is assembled starting with a first fragment of the packet and wherein the first fragment is retrieved by the main controller from the frame buffer using a pointer referencing a location of the first fragment in the frame buffer.

8. The apparatus of claim 7 wherein the pointer is stored in an entry of the CAM subsystem.

9. The apparatus of claim 8 wherein the CAM subsystem is a ternary CAM subsystem.

10. The apparatus of claim 1 wherein the main controller comprises a frame buffer controller that cooperates with queuing and dequeuing logic to store and retrieve fragments to/from the queues of the frame buffer.

11. The apparatus of claim 10 wherein the main controller further comprises an input queue data structure for use in managing the queues of the frame buffer.

12. The apparatus of claim 11 wherein the intermediate station is a network switch.

13. A method for high-speed reassembly of fragments received at an intermediate station in a computer network, the method comprising the steps of performing a first lookup operation into a content addressable memory (CAM) subsystem having a plurality of entries to locate a first offset zero fragment entry associated with a packet;

retrieving contents of a pointer field, a total length field and a 4-tuple field of the located entry;

using the content of the pointer field to obtain the first offset zero fragment from a queue of the frame buffer;

performing subsequent lookup operations into the CAM subsystem for subsequent fragments of the packet stored in the frame buffer using the contents of the 4-tuple field to obtain pointers to respective queues in the buffer;

obtaining the subsequent fragments from the queues using the pointers; and reassembling the fragments into proper order within an original packet by placing a data portion of each fragment in a relative position indicated by a fragment offset value of each fragment.

14. The method of claim 13 wherein the fragments received at the intermediate station are Internet Protocol (IP) fragments and wherein the contents of the 4-tuple field comprise an IP destination address, an IP source address, an IP protocol and an IP identification value.

15. The method of claim 14 wherein the step of performing subsequent lookup operations into the CAM subsystem comprises the step of varying each lookup operation according to the fragment offset value of each fragment.

16. The method of claim 15 wherein the step of varying each lookup operation comprises the step of calculating the fragment offset value according to the equation $FragmentOffset_{n+1}=FragmentOffset_n+Total\ Length_n$.

17. The method of claim 16 wherein the step of reassembling the fragments comprises the step of completing a reassembly process when a last fragment is added to the reassembled original packet.

18. The method of claim 17 further comprising the steps of:

comparing a current time with an expiration time stored in an expiration time field of each CAM entry; and deleting each entry of the CAM subsystem when the current time equals the expiration time associated with that entry.

19. The method of claim 18 wherein the step of deleting each entry comprises the step of deleting each entry of the CAM subsystem when the current time exceeds the expiration time associated with that entry.

20. The method of claim 19 wherein the CAM subsystem is a ternary CAM (TCAM) subsystem.

21. A router, comprising:

a frame buffer organized into a plurality of queues for storing a plurality of fragments of a frame received at said router;

a controller coupled to the frame buffer to reassemble an original packet from the fragments; and a content addressable memory (CAM) subsystem coupled to the controller, the CAM subsystem having a plurality of entries, each entry maintaining status information for each fragment of a frame received at the router.

22. The router of claim 21, further comprising:

at least one entry of the CAM subsystem maintains information about an IP total length of each original packet reassembled by the controller and a current length of each received fragment belonging to the packet.

23. The router of claim 21, further comprising:

the CAM subsystem is a ternary CAM subsystem.

24. The router of claim 21 further comprising:

an expiration time field of each CAM entry, and comparing a current time with an expiration time stored in the expiration time field; and means for deleting each entry of the CAM subsystem when the current time equals the expiration time associated with that entry.

25. The router of claim 24 further comprising:

means for deleting each entry of the CAM subsystem when the current time exceeds the expiration time associated with that entry.

26. A method for operating a router, comprising:

storing a plurality of fragments of a frame received at said router;

maintaining status information for each fragment of the frame in content addressable memory (CAM);

reassembling an original packet from the fragments in response to the status information.

27. The method of claim 26, further comprising:

maintaining, in at least one entry of the CAM subsystem, information about an IP total length of each original packet reassembled by the controller and a current length of each received fragment belonging to the packet.

28. The method of claim 26, further comprising:

implementing the CAM subsystem as a ternary CAM subsystem.

29. The method of claim 26 further comprising:

comparing a current time with an expiration time stored in an expiration time field of each CAM entry; and deleting each entry of the CAM subsystem when the current time equals the expiration time associated with that entry.

30. The method of claim 29 further comprising:

deleting each entry of the CAM subsystem when the current time exceeds the expiration time associated with that entry.

31. The method of claim 26, further comprising:

the CAM subsystem is a ternary CAM (TCAM) subsystem.

32. A router, comprising:

a frame buffer to store a plurality of fragments of a frame received at said router;

content addressable memory (CAM) to maintain status information for each fragment of the frame;

a controller to reassemble an original packet from the fragments in response to the status information.

33. The router of claim 32, further comprising:

at least one entry of the CAM subsystem maintains information about an IP total length of each original packet reassembled by the controller and a current length of each received fragment belonging to the packet.

34. The router of claim 32, further comprising:

the CAM subsystem is a ternary CAM subsystem.

35. A router, comprising:

means for storing a plurality of fragments of a frame received at said router;

means for maintaining status information for each fragment of the frame in content addressable memory (CAM);

means for reassembling an original packet from the fragments in response to the status information.

36. The router of claim 35, further comprising:

means for maintaining, in at least one entry of the CAM subsystem, information about an IP total length of each original packet reassembled by the controller and a current length of each received fragment belonging to the packet.

37. The router of claim 35, further comprising:

means for implementing the CAM subsystem as a ternary CAM subsystem.

38. The router of claim 35, further comprising:

means for comparing a current time with an expiration time stored in an expiration time field of each CAM entry; and means for deleting each entry of the CAM subsystem when the current time equals the expiration time associated with that entry.

39. The router of claim 38, further comprising:

means for deleting each entry of the CAM subsystem when the current time exceeds the expiration time associated with that entry.

40. The router of claim 35, further comprising:

the CAM subsystem is a ternary CAM (TCAM) subsystem.

41. A computer readable media, comprising:

said computer readable media having instructions written thereon for execution on a processor for the practice of the method of claim 13 or claim 26.

42. Electromagnetic signals propagating on a computer network, comprising:

said electromagnetic signals carrying instructions for execution on a processor for the practice of the method of claim 13 or claim 26.

* * * * *